(12) United States Patent
Morinaga et al.

(10) Patent No.: US 11,339,848 B2
(45) Date of Patent: May 24, 2022

(54) SHOCK ABSORBER WITH A HYDROSTOPPER

(71) Applicant: TOYOTA JIDOSHA KABUSHIKI KAISHA, Toyota (JP)

(72) Inventors: Hirofumi Morinaga, Miyoshi (JP); Asuka Mogi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/566,214

(22) Filed: Sep. 10, 2019

(65) Prior Publication Data

US 2020/0132156 A1 Apr. 30, 2020

(30) Foreign Application Priority Data

Oct. 26, 2018 (JP) .............................. JP2018-202124

(51) Int. Cl.
*F16F 9/58* (2006.01)
*F16F 15/023* (2006.01)
*F16F 9/18* (2006.01)

(52) U.S. Cl.
CPC ............... *F16F 9/585* (2013.01); *F16F 9/18* (2013.01); *F16F 15/023* (2013.01); *F16F 9/185* (2013.01); *F16F 2222/12* (2013.01); *F16F 2228/066* (2013.01); *F16F 2230/007* (2013.01)

(58) Field of Classification Search
CPC .... F16F 9/585; F16F 9/18; F16F 9/185; F16F 2222/12; F16F 2228/066; F16F 2230/007; F16F 15/023
See application file for complete search history.

(56) References Cited

U.S. PATENT DOCUMENTS

| | | | | |
|---|---|---|---|---|
| 5,810,130 A | * | 9/1998 | Mc Candless | .......... F16F 9/585 188/322.15 |
| 7,156,213 B2 | | 1/2007 | Vanspauwen | |
| 2004/0124051 A1 | * | 7/2004 | Lun | .......... F16F 9/535 188/267.1 |
| 2011/0000753 A1 | | 1/2011 | Kim | |

FOREIGN PATENT DOCUMENTS

DE 102004039702 A1 * 7/2006 ............... F16F 9/49
JP 2006-138367 A 6/2006

* cited by examiner

*Primary Examiner* — Xuan Lan Nguyen (74) *Attorney, Agent, or Firm* — Sughrue Mion, PLLC (57) ABSTRACT

A shock absorber with a hydrostopper is provided. The hydrostopper includes a stopper piston that is relatively displaceable along a rod portion of a piston and partitions one cylinder chamber into an upper chamber and a lower chamber, and a compression coil spring that biases the stopper piston against a stopper disc fixed to the rod portion in the lower chamber. The stopper piston has an orifice passage connecting the upper and lower chambers. The hydrostopper includes an elastic disk functioning as an elastically deformable member that increases an amount of elastic deformation to increase an amount of reduction of an effective passage cross-sectional area of the orifice passage as a differential pressure between pressures in the upper and lower chambers is larger when the pressure in the upper chamber is higher than the pressure in the lower chamber.

2 Claims, 11 Drawing Sheets

SHOCK ABSORBER WITH A HYDROSTOPPER

CROSS-REFERENCE TO RELATED APPLICATION

This application claims priority to Japanese Patent Application No. JP2018-202124 filed on Oct. 26, 2018, the content of which is hereby incorporated by reference in its entirety into this application.

BACKGROUND

1. Technical Field

The present disclosure relates to a shock absorber with a hydrostopper.

2. Description of the Related Art

As a shock absorber installed in a vehicle such as an automobile, a shock absorber with a hydrostopper is known which limits a relative displacement in an extension direction of a piston relative to a cylinder in a region where a relative displacement in the extension direction of the piston is large. The shock absorber has a cylinder, and a piston that fits in the cylinder and cooperates with the cylinder to form variable volume upper and lower cylinder chambers, and a hydrostopper is provided in the upper cylinder chamber that receives a rod portion of the piston. An example of a shock absorber with a hydrostopper is described, for example, in U.S. Pat. No. 7,156,213.

The hydrostopper includes a stopper piston, an engagement member, and a biasing member that biases the stopper piston against the engagement member. The stopper piston is fitted to the rod portion of the piston so as to be relatively displaceable along the rod portion and divides the upper cylinder chamber into two stopper chambers, and has an orifice passage connecting the two stopper chambers. The engagement member is fixed to the rod portion in the stopper chamber located on the lower cylinder chamber side with respect to the stopper piston.

When a relative displacement in the extension direction of the piston with respect to the cylinder exceeds a reference value, the engagement member abuts on the stopper piston and moves the stopper piston in the extension direction of the piston against biasing force of the biasing member. As a result, a differential pressure is generated between pressures in the two stopper chambers, so that oil in the stopper chamber having a higher pressure flows through the orifice passage to the stopper chamber having a lower pressure, whereby a damping force against the relative displacement of the piston in the extension direction is generated, and the relative displacement in the extension direction is limited.

The damping force is higher as a relative velocity of the piston to the cylinder is higher and a differential pressure between pressures in the two stopper chambers is larger. Therefore, as the relative velocity of the piston with respect to the cylinder is higher, the effect of limiting the relative displacement in the extension direction automatically becomes higher.

An orifice of an orifice passage in a conventional shock absorber with a hydrostopper is a fixed orifice having a constant effective passage cross-sectional area. When an effective passage cross-sectional area of the orifice is set small, damping force becomes high, so that the relative displacement of the piston in the extension direction can be effectively limited. However, since damping force generated by the oil passing through the orifice is high even if a relative velocity of the piston is low, it acts to rapidly decelerate the piston early after the start of generation of the damping force. Therefore, when such a shock absorber is applied to a vehicle, there is a possibility that an occupant or occupants may feel a shock.

On the other hand, when the effective passage cross-sectional area of the orifice is set large, damping force generated by the oil passing through the orifice is low, so that even if a relative speed of the piston is increased, no damping force is generated which effectively decelerates the piston displacing in the extension direction. Therefore, it is easy to cause a rebound stopper hit, and a shock and a sound are apt to occur.

SUMMARY

The present disclosure provides an improved shock absorber with a hydrostopper capable of effectively decelerating a piston even in a situation where a relative velocity of the piston is high, while reducing the possibility of a shock occurring due to rapid increase of a damping force generated by the hydrostopper.

According to the present disclosure, a shock absorber with a hydrostopper is provided which comprises: a cylinder, a piston fitted to the cylinder and cooperating with the cylinder to form first and second cylinder chambers of variable volume, the first cylinder chamber receiving a rod portion of the piston, and a hydrostopper that is configured to limit relative displacement of the piston in an extension direction relative to the cylinder, the hydrostopper comprising a stopper piston that is fitted to the rod portion so as to be relatively displaceable along the rod portion and divides the first cylinder chamber into first and second stopper chambers, an engagement member fixed to the rod portion in the second stopper chamber located on the side of the second cylinder chamber relative to the stopper piston, and a biasing member for biasing the stopper piston against the engagement member, and the stopper piston having an orifice passage connecting the first and second stopper chambers.

The hydrostopper includes an elastically deformable member configured to reduce an effective passage cross-sectional area of the orifice passage by elastic deformation, and the elastically deformable member is configured to increase a reduction amount of the effective passage cross-sectional area as a differential pressure between pressures in the first and second stopper chambers is larger when the pressure in the first stopper chamber is higher than the pressure in the second stopper chamber.

According to the above configuration, the elastically deformable member included in the hydrostopper reduces the effective passage cross-sectional area of the orifice passage by elastic deformation. As a differential pressure between pressures in the first and second stopper chambers is larger when the pressure in the first stopper chamber is higher than the pressure in the second stopper chamber, an amount of elastic deformation of the elastically deformable member increases and a reduction amount of the effective passage cross-sectional area is increased.

Therefore, in a situation where a relative velocity of the piston is low, it is possible to reduce the possibility of occurrence of shock due to a rapid increase of the damping force generated by the hydrostopper. On the other hand, in a situation where the relative velocity of the piston is high, a large damping force is generated, and a rate of increase of the damping force with an increase of the relative velocity increases as the relative velocity increases, so that the piston can be effectively decelerated to effectively limit the relative displacement of the piston in the extension direction.

In one aspect of the present disclosure, the elastically deformable member is configured to cooperate with the stopper piston to form a part of the orifice passage, and reduce a cross-sectional area of the part by elastic deformation, thereby reducing the effective passage cross-sectional area of the orifice passage.

According to the above aspect, a part of the orifice passage is formed by the cooperation of the elastically deformable member and the stopper piston, and the effective passage cross-sectional area of the orifice The "rubber-like elastic material" in the present application may be any material known in the art that is liquid impermeable and can be elastically compressively deformed by being compressed. For example, it may be rubber, a thermoplastic resin having elasticity or a thermosetting resin having elasticity.

Further, in another aspect of the present disclosure, the elastically deformable member is formed of a rubber-like elastic material, and is configured to be compressively deformed by being pressed against the stopper piston by a differential pressure between pressures in the first and second stopper chambers and reduce the sectional area of the part by changing a cross-sectional shape of the part.

According to the above aspect, the elastically deformable member formed of a rubber-like elastic material is compressively deformed by being pressed against the stopper piston by a differential pressure between pressures in the first and second stopper chambers, and a cross-sectional shape of the part of the orifice passage changes, which reduces the cross-sectional area of the part. Therefore, as an amount of elastic deformation of the elastically deformable member increases, the reduction amount in the cross-sectional area of a part of the orifice passage increases, so that as a differential pressure between pressures in the first and second stopper chambers increases, the reduction amount of the effective passage cross-sectional area can be increased. passage is reduced by reducing the cross-sectional area of the part of the orifice passage by the elastic deformation of the elastically deformable member. Therefore, the effective passage cross-sectional area of the orifice passage decreases as an amount of elastic deformation of the elastically deformable member increases, so that the larger a differential pressure between pressures in the first and second stopper chambers, the larger a reduction amount in the effective passage cross-sectional area can be made.

In another aspect of the present disclosure, the elastically deformable member is formed of a rubber-like elastic material, and is configured to be compressively deformed by being compressed between the stopper piston and the engagement member and enter the part, thereby reducing the cross-sectional area of the part.

According to the above aspect, the elastically deformable member formed of a rubber-like elastic material is compressively deformed by being compressed between the stopper piston and the engagement member, and enters a part of the orifice passage, whereby the cross-sectional area of the part decreases. Therefore, as an amount of elastic deformation of the elastically deformable member increases and an amount of entrance into the part increases, the reduction amount in the cross-sectional area of the part of the orifice passage increases, so that as a differential pressure between pressures in the first and second stopper chambers is larger, a reduction amount of the effective passage cross-sectional area can be made larger.

Further, in another aspect of the present disclosure, the elastically deformable member is a bent deformable valve member that forms the part in cooperation with a valve seat provided on the stopper piston, and the valve member is configured to cooperate with the valve seat to reduce the cross-sectional area of the part by being pressed against the valve seat and being bent deformed by a differential pressure between pressures in the first and second stopper chambers.

According to the above aspect, a bent deformable valve member cooperates with a valve seat provided on the stopper piston to form the part of the orifice passage. A differential pressure between pressures in the first and second stopper chambers causes the valve member to be pressed against the valve seat and to be bent deformed, thereby reducing the cross-sectional area of the part of the orifice passage. Therefore, as an amount of bent deformation of the valve member increases, an reduction amount in the cross-sectional area of the part of the orifice passage increases, so that as a differential pressure between pressures in the first and second stopper chambers increases, the reduction amount in the cross-sectional area can be increased.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
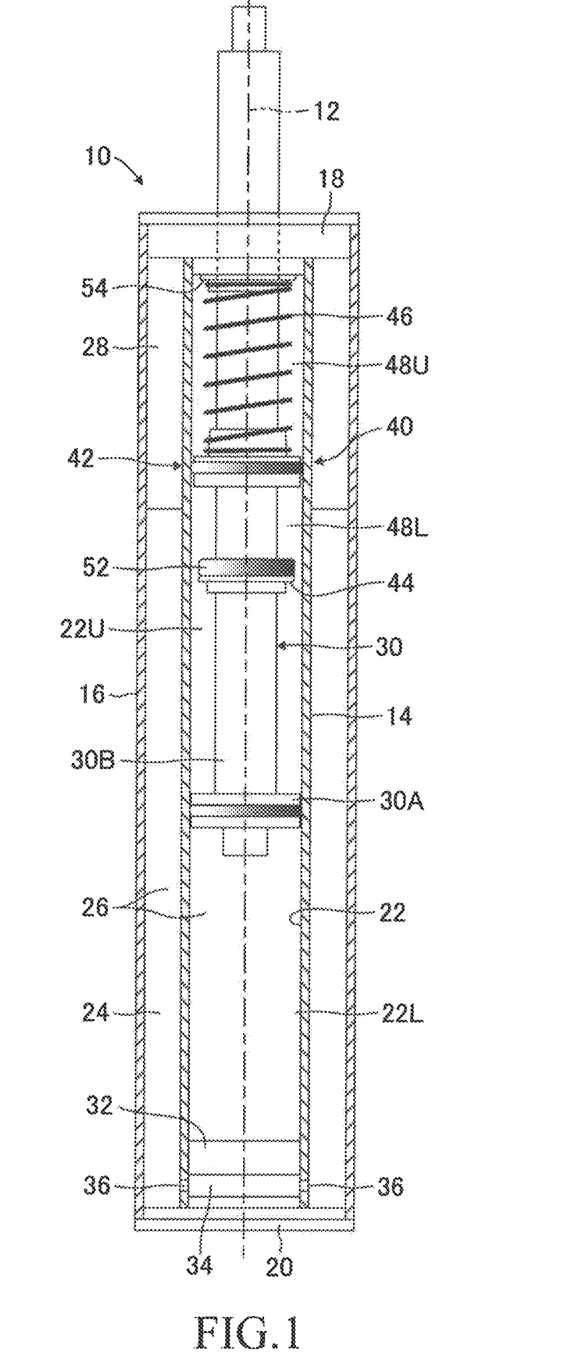
FIG. 1 shows a longitudinal section through a first embodiment of a shock absorber according to the present disclosure configured as a twin-tube type shock absorber.

In FIG. 1, the shock absorber 10 according to the first embodiment is a twin-tube type shock absorber, and includes a cylinder 14 and an outer shell 16 which extend concentrically along an axis 12. An upper cap 18 and a lower cap 20 are fixed to upper and lower ends, respectively, of the cylinder 14 and the outer shell 16. The upper cap 18 and the lower cap 20 cooperate with the cylinder 14 to define a cylinder chamber 22 and cooperate with the cylinder 14 and the outer shell 16 to define an annular chamber 24. Oil 26 is enclosed in the cylinder chamber 22 and the annular chamber 24, and inert gas 28 such as nitrogen gas is enclosed in an upper part of the annular chamber 24. Although not shown, a rebound stopper is mounted on a lower surface of the upper cap 18 to prevent relative displacement in an extension direction of a piston 30 with respect to the cylinder 14 from becoming greater than a predetermined value.

The piston 30 is disposed in the cylinder chamber 22 so as to reciprocate along the axis 12. The piston 30 has a main body portion 30A fitted to the cylinder 14 and a rod portion 30B integrally connected with the main body portion 30A and extending along the axis 12. Although not shown in FIG. 1, the main body portion 30A of the piston 30 is provided with damping force generating valves for extension and compression strokes. These damping force generating valves may have any structure known in the art.

The main body portion 30A is fitted to the cylinder 14 and divides the cylinder chamber 22 into an upper cylinder chamber 22U as a first cylinder chamber and a lower cylinder chamber 22L as a second cylinder chamber. The main part of the rod portion 30B is disposed in the upper cylinder chamber 22U and extends through the upper cap 18 to the upper side of the upper cap. The upper cap 18 functions as a rod guide for supporting the rod portion 30B reciprocally along the axis 12, and incorporates an oil seal (not shown) for sealing between the upper cap and the rod portion 30B. When the shock absorber 10 is applied to a vehicle such as an automobile, an upper end of the rod portion 30B is connected to a sprung member, and the outer shell 16 is connected to an unsprung member.

In the vicinity of the lower end of the cylinder 14, a partition wall 32 is fixed to be separated from the lower cap 20, and the partition wall 32 cooperates with the cylinder 14 and the lower cap 20 to form a communication chamber 34. The communication chamber 34 is connected to the annular chamber 24 by communication holes 36 provided in the cylinder 14. Although not shown in FIG. 1, the partition wall 32 is provided with a damping force generating valves (base valves) for extension and compression strokes. These damping force generating valves may also have any structure known in the art.

In the upper cylinder chamber 22U that receives the rod portion 30B, a hydrostopper 40 is provided that limits the relative displacement of the piston 30 relative to the cylinder 14 in the extension direction (upward as viewed in FIG. 1). The hydrostopper 40 includes a stopper piston 42, a stopper disk 44 functioning as an engagement member, and a compression coil spring 46 that is disposed between the stopper piston 42 and the upper cap 18 and functions as a biasing member.

The stopper disc 44 is preferably made of metal, but the stopper piston 42 may be made of metal or resin. A position of the stopper piston in the situation where the stopper disk 44 is not in contact with the stopper piston 42 is a position where a downward force by gravity acting on the stopper piston balances an upward force by an extension deformation of the compression coil spring 46.

Figure 3:
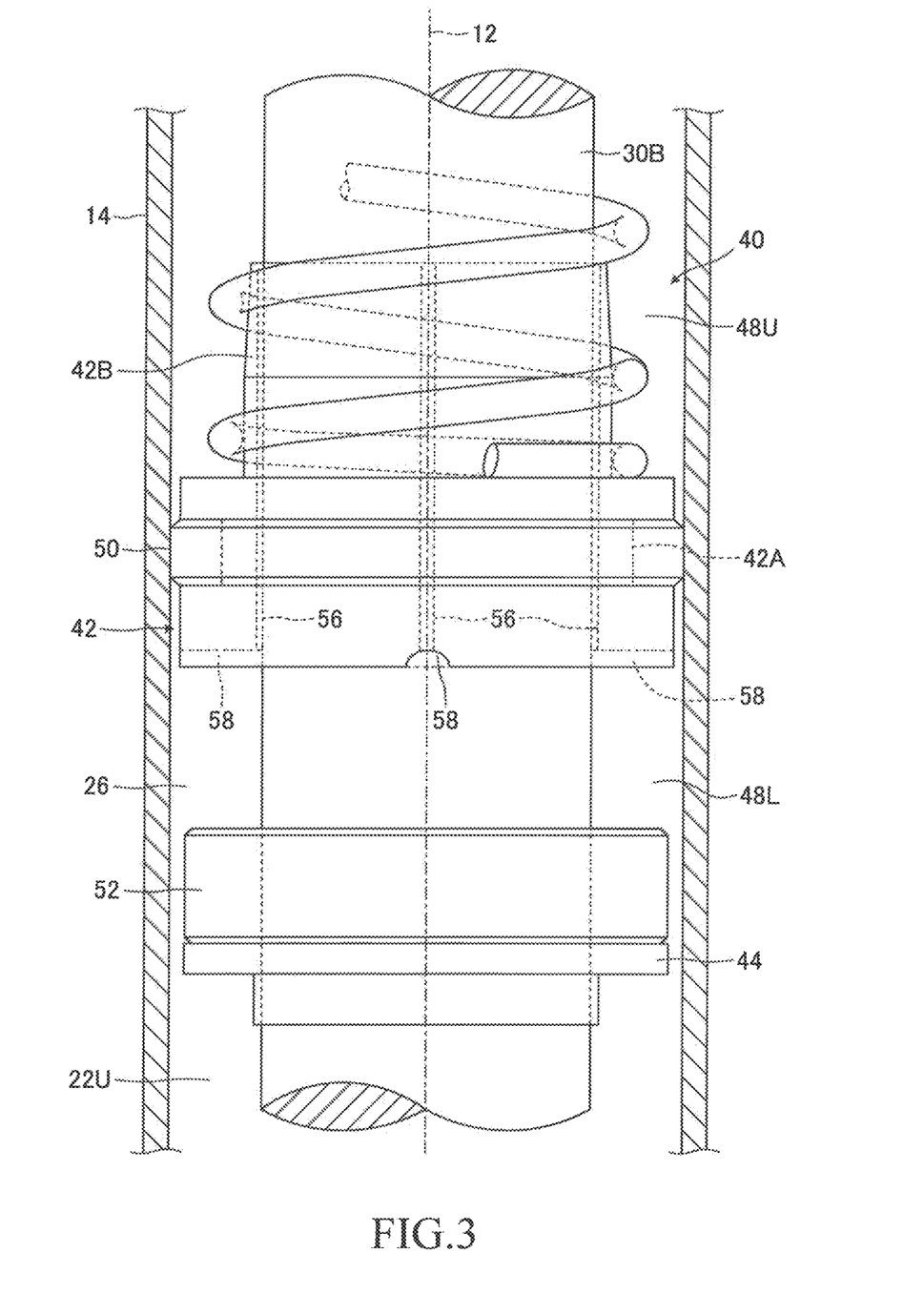
FIG. 3 is an enlarged partial view showing the stopper piston, an elastic disc and a stopper disc of the first embodiment for a situation where there is no differential pressure between pressure in an upper stopper chamber and pressure in a lower stopper chamber.
Figure 4:
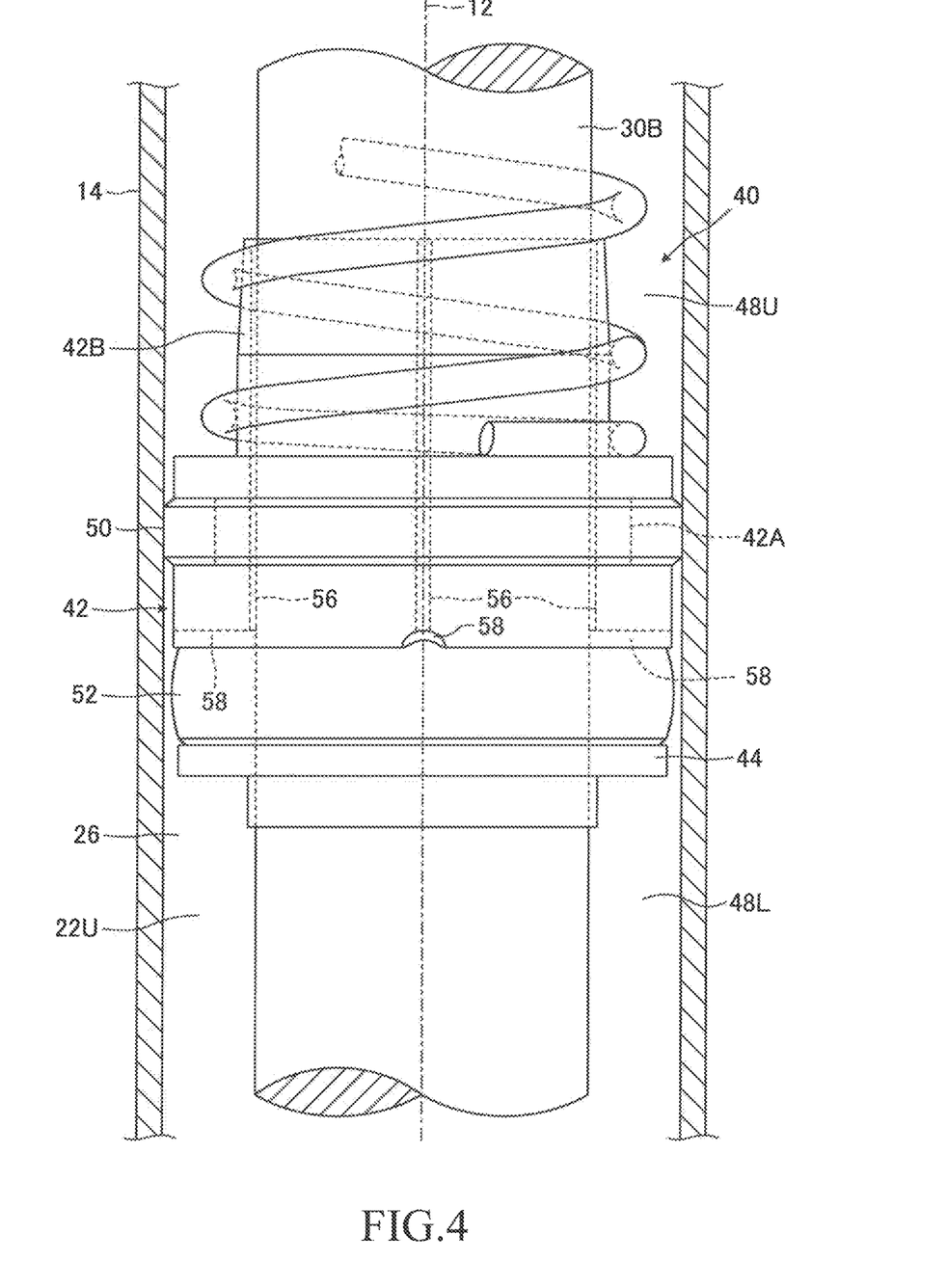
FIG. 4 is an enlarged partial view showing the stopper piston, the elastic disc and the stopper disc of the first embodiment for a situation where the pressure in the upper stopper chamber is higher than the pressure in the lower stopper chamber.

As shown in FIGS. 3 and 4, the stopper piston 42 is fitted to the rod portion so as to be relatively displaceable along the rod portion 30B, and has an outer diameter smaller than an inner diameter of the cylinder 14. The stopper piston 42 has a concave groove 42A having a substantially rectangular cross section on the cylindrical outer surface, and an O-ring seal 50 is disposed in the concave groove 42A in a substantially close fitting manner. The O-ring seal 50 is formed of a rubber-like elastic material and has a substantially cylindrical shape. Notably, the O-ring seal 50 may be fitted into the concave groove 42A by being elastically expanded in diameter. Alternatively, the stopper piston 42 may be formed of two parts, and the two parts may be integrally connected, for example, by press-fitting with the O-ring seal disposed between the two parts.

The O-ring seal 50 is in close contact with an inner surface of the cylinder 14 on a cylindrical outer peripheral surface to prevent the oil 26 from flowing between an upper stopper chamber 48U and a lower stopper chamber 48L through a space between the stopper piston 42 and the cylinder 14. Thus, the stopper piston 42 cooperates with the O-ring seal 50 to divide the upper cylinder chamber 22U into the upper stopper chamber 48U and the lower stopper chamber 48L functioning as first and second stopper chambers, respectively. In the first embodiment, the stopper piston 42 has a cylindrical portion 42B that fits around the rod portion 30B and protrudes upward in the figures.

The stopper disc 44 is fixed to the rod portion 30B between the stopper piston 42 and the main body portion 30A of the piston 30, in other words, in the lower stopper chamber 48L located on the side of the lower cylinder chamber 22L with respect to the stopper piston 42. In the first embodiment, an elastic disc 52 formed of a rubber-like elastic material and functioning as an elastically deformable member is fixed to an upper surface of the stopper disc 44, and the elastic disc 52 extends annularly around the rod portion 30B. Outer diameters of the stopper disk 44 and the elastic disk 52 are smaller than the inner diameter of the cylinder 14. Thus, the oil 26 can freely flow up and down around the stopper disc 44 and the elastic disc 52.

Figure 2:
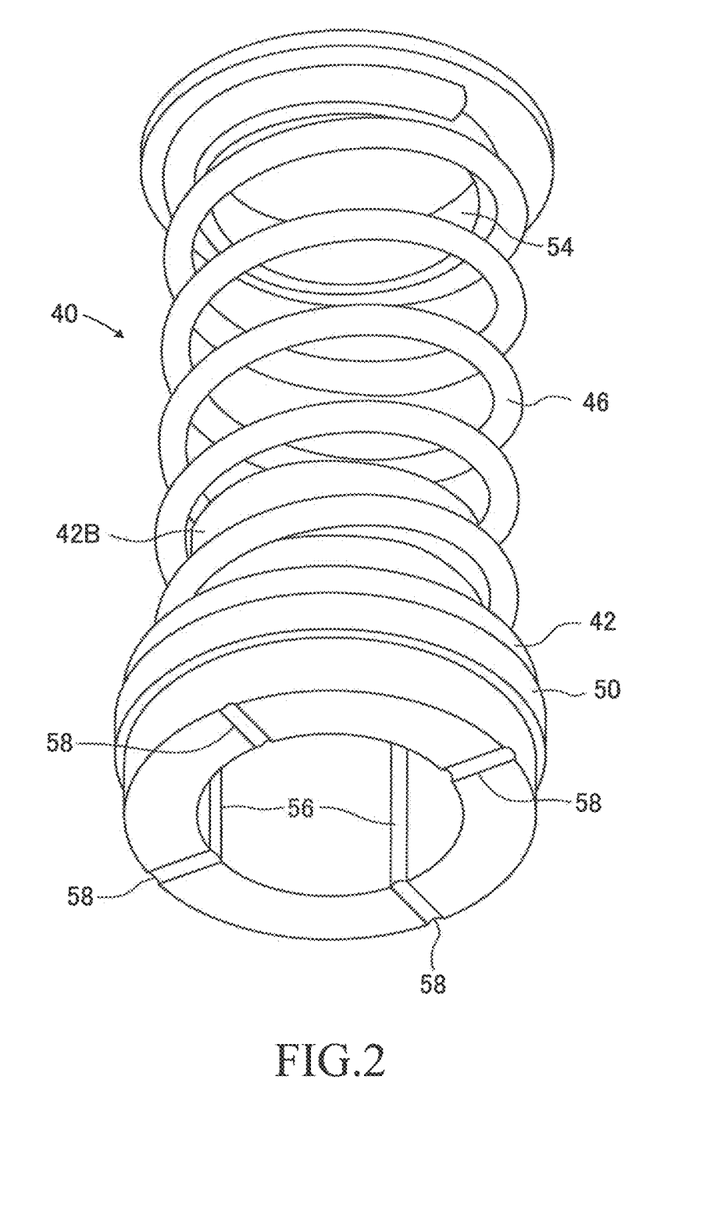
FIG. 2 is a perspective view showing a stopper piston and a compression coil spring of the first embodiment as viewed obliquely from below.

As shown in FIG. 2, an upper end of the compression coil spring 46 is supported by an upper spring seat 54 fixed to a lower surface of the upper cap 18, thereby integrally coupled with an upper cap 18 via the upper spring seat 54. A lower end of the coil spring 46 is supported by the cylindrical portion 42B of the stopper piston 42 by closely fitting to the cylindrical portion and is in contact with the upper surface of the stopper piston 42, thereby being integrally connected with the stopper piston 42. A length of the compression coil spring 46 is set to a length such that the stopper piston 42 is spaced upward in the figures from the elastic disc 52 when the relative displacement in the extension direction of the piston 30 with respect to the cylinder 14 is less than a reference value.

As shown in FIGS. 2 to 4, a cylindrical inner surface of the stopper piston 42 is provided with four longitudinal grooves 56. The longitudinal grooves 56 are equally spaced about the axis 12, extend along the axis 12 and each have a rectangular or radially inwardly opening U-shaped cross-sectional shape. Four radial grooves 58 are provided on a planar lower surface of the stopper piston 42. Each radial groove 58 is connected at a radially inner end to the corresponding longitudinal groove 56, extends in the radial direction, and has an arc-shaped cross-sectional shape. The radial grooves 58 communicate with the lower stopper chamber 48 even when the elastic disc 52 is in contact with the lower surface of the stopper piston 42, so that the longitudinal grooves 56 and the radial grooves 58 cooperate with each other to form an orifice passage connecting the upper stopper chamber 48U and the lower stopper chamber 48L. Notably, the number of the longitudinal grooves 56 and the radial grooves 58 may be other than four.

A cross-sectional area of each longitudinal groove 56 is set to a size that allows the oil 26 to flow without substantially exerting a throttling effect. On the other hand, a cross-sectional area of each radial groove 58 is set equal to or less than the cross-sectional area of the longitudinal grooves 56, and consequently, when the elastic disc 52 is in contact with the lower surface of the stopper piston 42, the radial grooves 58 exert a throttling effect on the oil 26 flowing therethrough, so that the radial grooves cooperate with the elastic disc 52 to function as orifices (parts of the orifice passage).

In the extension stroke of the shock absorber 10, the piston 30 is displaced upward as viewed in FIG. 1 relative to the cylinder 14, and a volume of the upper cylinder chamber 22U decreases and a volume of the lower cylinder chamber 22L increases. As a result, the oil 26 in the upper cylinder chamber 22U flows to the lower cylinder chamber 22L, and the oil 26 in the annular chamber 24 flows to the lower cylinder chamber 22L. Therefore, damping forces are generated by the damping force generating valves for the extension stroke provided in the main body portion 30A of the piston 30 and the partition wall 32. A damping force of the shock absorber 10 as a whole is determined mainly by the damping force generated by a damping force generating valve for extension stroke provided in the main body 30A.

On the other hand, in the compression stroke of the shock absorber 10, the piston 30 is displaced downward as viewed in FIG. 1 relative to the cylinder 14, and the volume of the upper cylinder chamber 22U increases and the volume of the lower cylinder chamber 22L decreases. As a result, the oil 26 in the lower cylinder chamber 22L flows to the upper cylinder chamber 22U, and the oil 26 in the lower cylinder chamber 22L flows to the annular chamber 24. Therefore, damping forces are generated by the damping force generating valves for the compression stroke provided in the main body portion 30A of the piston 30 and the partition wall 32. A damping force of the shock absorber 10 as a whole is determined mainly by the damping force generated by the damping force damping valve provided in the partition wall 32.

In particular, when a relative displacement in the extension direction of the piston 30 with respect to the cylinder 14 exceeds the reference value in the extension stroke of the shock absorber 10, the elastic disc 52 abuts against the stopper piston 42, and the radial grooves 58 function as orifices. Accordingly, a pressure in the upper stopper chamber 48U becomes higher than a pressure in the lower stopper chamber 48L, so that the elastic disc 52 receives a compression load due to a differential pressure between the two pressures from the stopper piston 42 and the stopper disk 44. The compression load increases as a relative velocity of the piston 30 to the cylinder 14 increases.

Further, the stopper piston 42 is pushed upward as viewed in FIG. 1 by the stopper disk 44 via the elastic disk 52. As a result, the compression coil spring 46 is compressively deformed, and biases the stopper piston 42 against the stopper disk 44, so that the elastic disk 52 receives a compression load resulting from a spring force of the compression coil spring 46 from the stopper piston 42 and the stopper disk 44. Thus, the compression load increases as the relative displacement of the piston 30 with respect to the cylinder 14 increases.

As shown in FIG. 4, the elastic disc 52 is compressively deformed when subjected to the compressive load, and bulges radially outward, and at the same time, portions facing the radial grooves 58 partially enter the radial grooves to reduce effective passage cross-sectional areas of the radial grooves 58 which are parts of the orifice passage. Therefore, as shown by the solid lines in FIG. 5, a damping force generated by the oil 26 passing through the orifice passage, that is, a force Fre for suppressing the relative displacement of the piston 30 in the extension direction with respect to the cylinder 14 increases as a relative velocity Vre of the piston 30 increases, and increases as a relative displacement amount Lre of the piston 30 increases.

Figure 5:
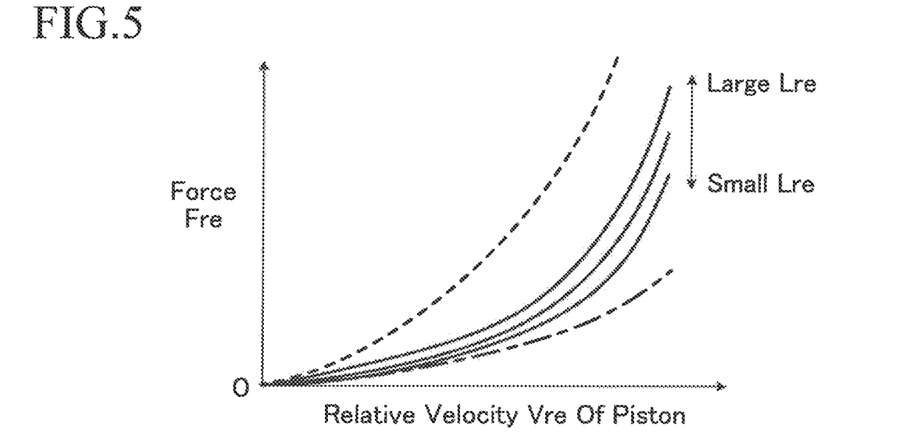
FIG. 5 is a graph showing a relationship between a relative velocity Vre of a piston and a relative displacement amount Lre of the piston, and a force Fre suppressing the relative displacement in an extension direction of the piston with respect to the first embodiment (solid line) and a conventional shock absorber (broken line and one-dot chain line).

In FIG. 5, a broken line and an one-dot chain line respectively show examples where the effective passage cross-sectional area is set small and large in a conventional shock absorber in which the effective passage cross-sectional area of the orifice passage is constant. When the effective passage cross-sectional area is set small, a damping force generated by the oil 26 passing through the orifice passage is high even if a relative velocity Vre is low, so that it acts to rapidly decelerate the piston 30 early after the start of the generation of the damping force. Therefore, when the shock absorber is applied to a vehicle, there is a possibility that an occupant or occupants may feel a shock. Conversely, when the effective passage cross-sectional area is set large, the damping force generated by the oil 26 passing through the orifice passage is low, so that even when a relative velocity Vre is high, no damping force is generated which effectively decelerates the piston 30 displaced in the extension direction. Therefore, it is easy to cause a rebound stopper hit, and a shock and a sound are apt to occur.

On the other hand, according to the first embodiment, a damping force in a region where a relative velocity Vre is high can be increased while reducing a damping force in a region where a relative velocity Vre is low. Further, as compared to where the effective passage cross-sectional area is set large in the conventional shock absorber (the one-dot chain line), it is possible to increase the degree of increase in increasing rate in the damping force (rate of increase in the slope of the curve in FIG. 5) as a relative velocity Vre increases. Therefore, the piston 30 can be effectively decelerated and stopped even in a situation where a relative velocity Vre is high, while reducing the possibility that an occupant or occupants feels a shock at the start of the generation of the damping force. Accordingly, it is possible to reduce the risks of an occurrence of rebound stopper hit and an occurrence of a shock and a sound due to this.

Figure 6:
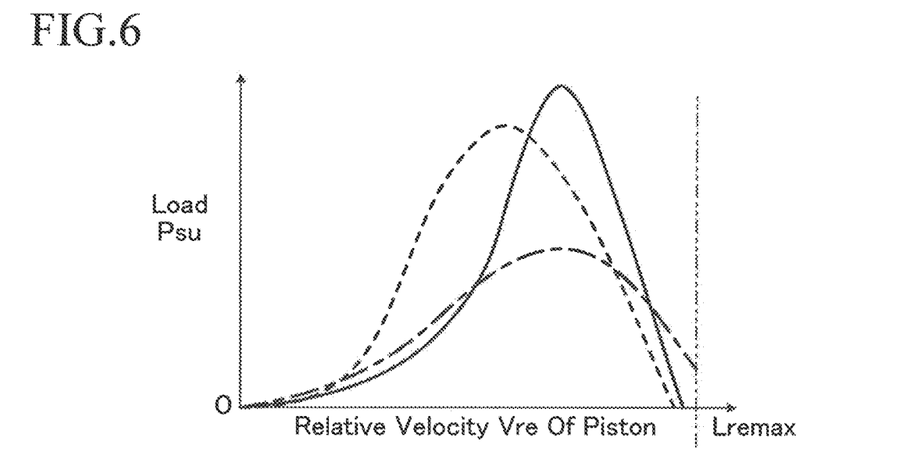
FIG. 6 is a graph showing an example of a relationship between the relative displacement amount Lre of the piston and a load Psu that suppresses an extension stroke of the shock absorber by damping force of the hydrostopper for a situation where a force for driving the piston in the extension direction and a relative velocity Vre of the piston are high.
Figure 7:
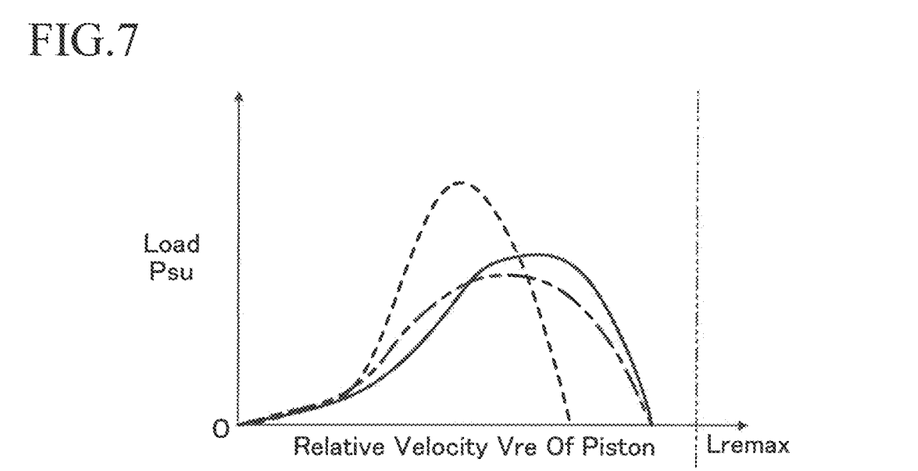
FIG. 7 is a graph showing an example of a relationship between a relative displacement amount Lre of the piston and a load Psu that suppresses the extension stroke of the shock absorber by damping force of the hydrostopper for a situation where a force for driving the piston in the extension direction and a relative velocity Vre of the piston are low.

FIGS. 6 and 7 are diagrams illustrating examples of a relationship between a relative displacement amount Lre of the piston 30 and a load Psu which suppresses an extension stroke of the shock absorber 10 by a damping force of the hydrostopper 40 for situations where a relative velocity Vre of the piston is high and low, respectively. In FIGS. 6 and 7, the solid line shows an example of the first embodiment, and the broken line and the one-dot chain line respectively show situations where the effective passage cross-sectional area is set small and large in a conventional shock absorber in which the effective passage cross-sectional area of the orifice passage is constant. Lremax represents a relative displacement of the piston corresponding to a full rebound of the shock absorber.

As shown in FIG. 6, when the effective passage cross-sectional area is set small in the conventional shock absorber, in a situation where a relative velocity Vre is high, the damping force relatively rapidly increases as the relative displacement amount Lre increases in a region where the relative displacement amount Lre of the piston 30 is relatively small. As a result, the relative velocity Vre of the piston 30 rapidly decreases in the process of the relative displacement amount Lre increasing further, so that a shock may occur due to this. Further, the damping force and the load Psu also decrease rapidly, so that the load Psu becomes zero before the relative displacement amount Lre reaches the relative displacement amount Lremax corresponding to the full rebound. In other words, since the load of the extension stroke of the shock absorber 10 becomes zero, the rebound stroke of the shock absorber ends before it becomes full rebound.

In addition, in the conventional shock absorber, when the effective passage cross-sectional area is set large, a generated damping force is small, and an increasing rate of the damping force accompanying the increase of the relative displacement amount Lre of the piston 30 is also small, so that a rate of increase of the load Psu is also small. As a result, a decrease amount of the relative velocity Vre of the piston 30 is also small, so that a decrease of the load Psu is delayed, and the relative displacement of the piston 30 in the extension direction cannot be effectively suppressed. Therefore, even if the relative displacement amount Lre of the piston becomes Lremax, the load Psu does not become zero. In other words, the load of the extension stroke of the shock absorber 10 does not become zero, so that a shock and a sound may be generated due to the stopper piston striking the rebound stopper.

On the other hand, in the first embodiment, a damping force and an increase rate thereof in a region where the relative displacement amount Lre of the piston is small are small, so that the load Psu and the increase rate thereof are also small. Thus, it is possible to avoid an occurrence of a shock and a sound due to the load Psu and the rate of increase thereof being high and the relative velocity Vre of the piston 30 rapidly decreasing. Further, as the relative displacement Lre of the piston increases, the damping force and its rate of increase cumulatively increase, so that the load Psu and its rate of increase also increase cumulatively. Therefore, the relative displacement in the extension direction of the piston 30 can be effectively suppressed, so that it is possible to prevent the occurrence of a shock and a sound due to the stopper piston striking the rebound stopper while preventing the rebound stroke of the shock absorber from becoming excessively smaller than the stroke of the full rebound.

In particular, according to the first embodiment, the compression coil spring 46 not only biases the stopper piston 42 downward, but also contributes to a compressive deformation of the elastic disc 52 by applying a compressive load to the elastic disc. As a result, the elastically deformable member can be compressively deformed more efficiently than the second embodiment in which the elastically deformable member (an O-ring seal) is compressed only by a differential pressure between pressures in the upper stopper chamber 48U and the lower stopper chamber 48L. Further, the compression load by the compression coil spring 46 increases as the relative displacement in the extension direction of the piston 30 increases, so that a damping force generated by the oil passing through the radial groove 58 can be increased as the relative displacement increases.

Second Embodiment

Figure 8:
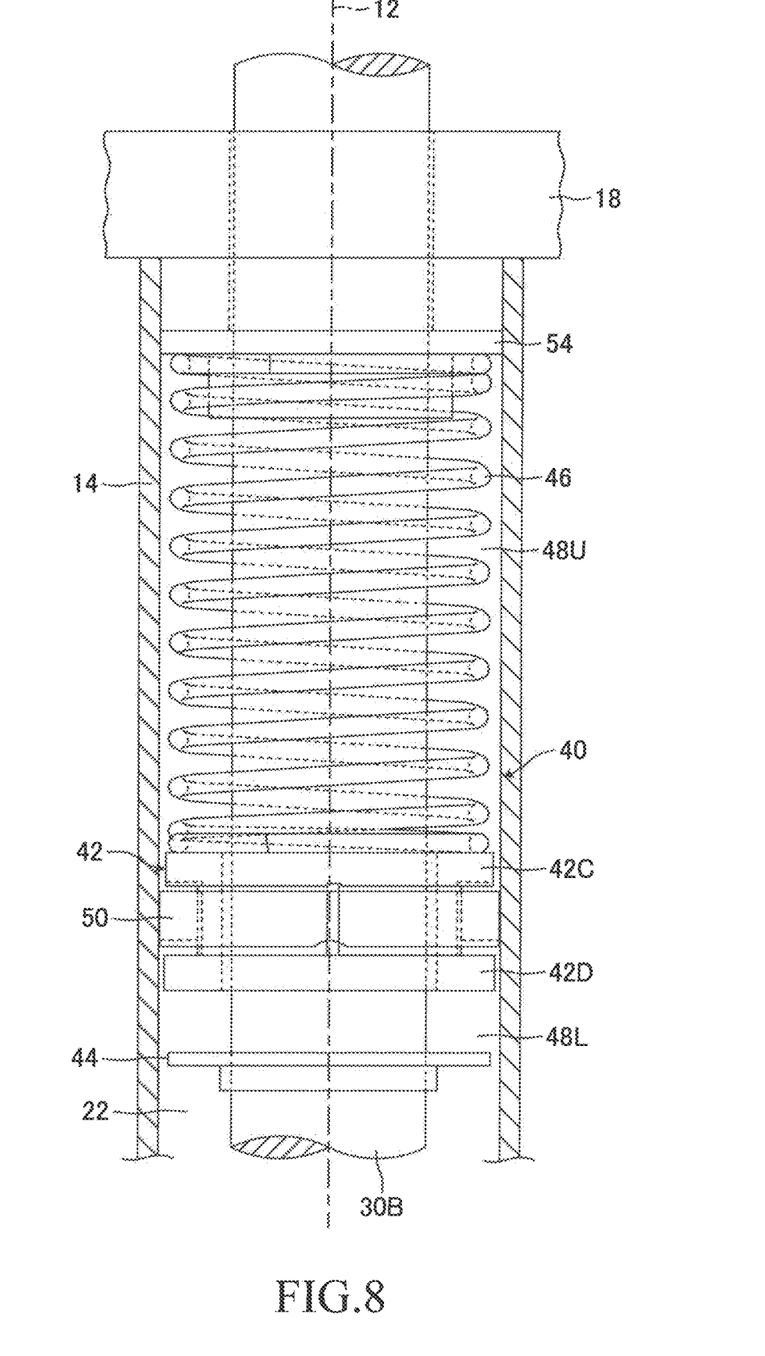
FIG. 8 is a cross-sectional view of a hydrostopper according to a second embodiment of a shock absorber according to the present disclosure.
Figure 9:
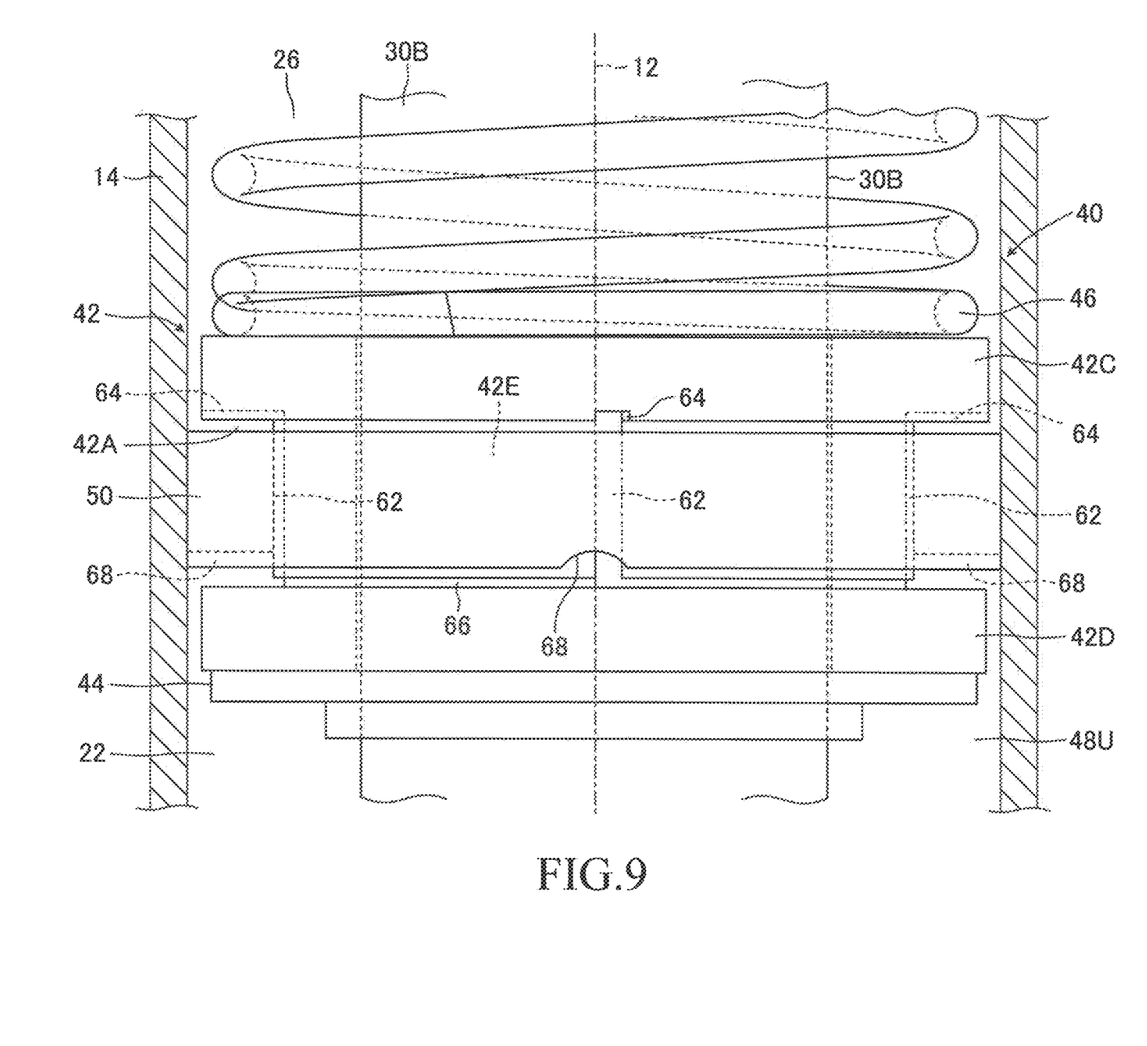
FIG. 9 is an enlarged partial view showing a stopper piston and an O-ring seal in the second embodiment for a situation where there is no differential pressure between pressure in the upper stopper chamber and pressure in the lower stopper chamber.
Figure 10:
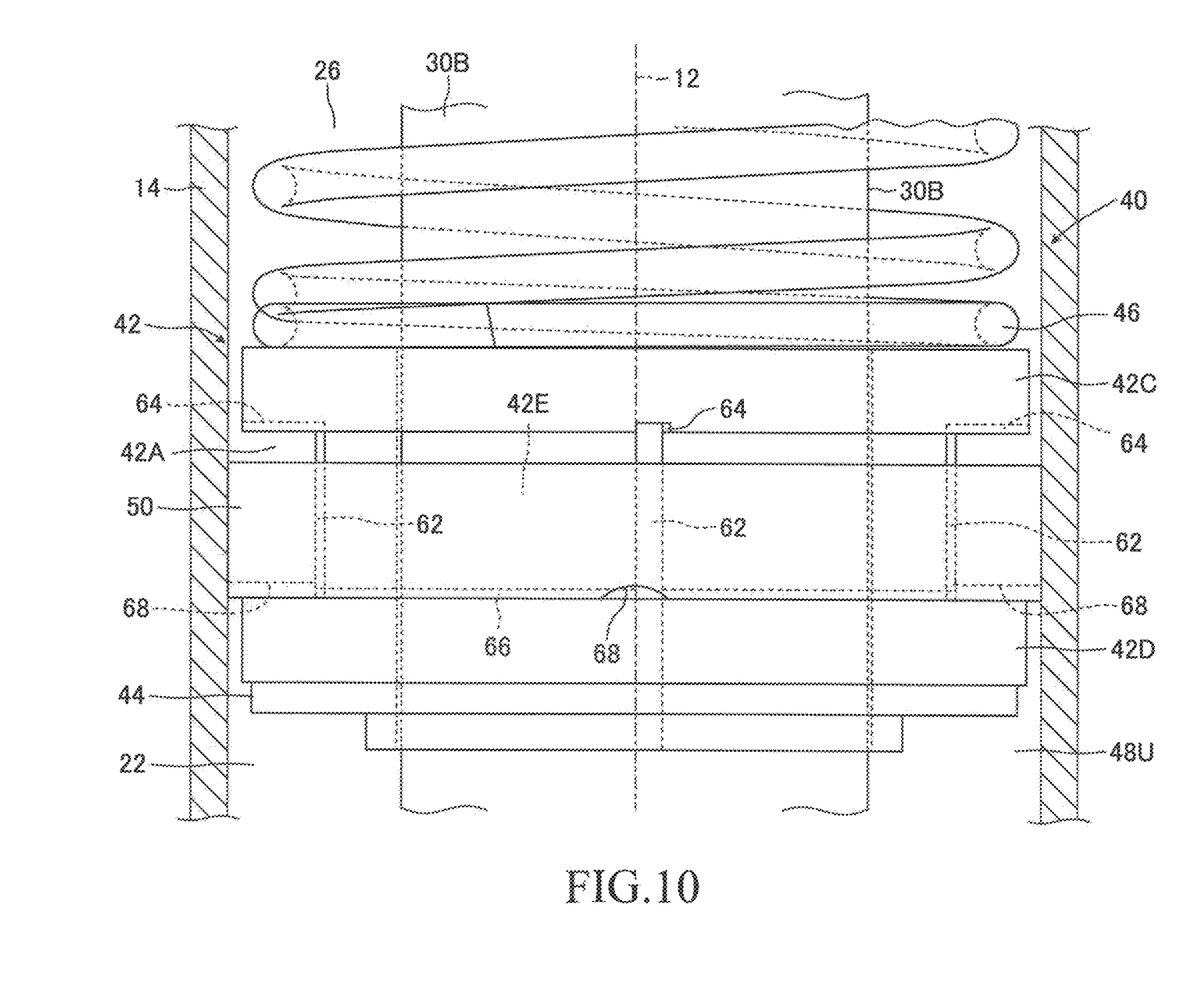
FIG. 10 is an enlarged partial view showing the stopper piston and the O-ring seal in the second embodiment for a situation where the pressure in the upper stopper chamber is higher than the pressure in the lower stopper chamber.

FIG. 8 is a cross-sectional view showing a hydrostopper in the second embodiment of a shock absorber according to the present disclosure, and FIGS. 9 and 10 are enlarged partial views showing a stopper piston and an O-ring seal. It is to be noted that in these figures, the same members as or corresponding members to those shown in FIGS. 1 to 4 are denoted by the same reference numerals as in FIGS. 1 to 4. The same applies to FIGS. 11 to 14 showing the third embodiment described later.

In the second embodiment as well, a substantially cylindrical O-ring seal 50 formed of a rubber-like elastic material is disposed in the concave groove 42A of the stopper piston 42. The O-ring seal 50 is in close contact with the inner surface of the cylinder 14 on the cylindrical outer peripheral surface, and prevents oil 26 from flowing between the upper stopper chamber 48U and the lower stopper chamber 48L through the space between the stopper piston 42 and the cylinder 14. However, in the second embodiment, the dimension of the O-ring seal 50 in the vertical direction is smaller than a vertical width of the concave groove 42A, that is, a distance between a lower surface of an upper annular disc portion 42C of the stopper piston 42 and an upper surface of a lower annular disc portion 42D. Further, an inner diameter of the O-ring seal 50 is larger than a diameter of the cylindrical surface of the concave groove 42A, so that the O-ring seal 50 is displaceable relative to the stopper piston 42 along the axis 12. Notably, in FIGS. 8 to 10, the cylindrical portion 42B of the stopper piston 42 is not shown.

As shown in FIGS. 8 to 10, an outer surface of a cylindrical portion 42E between the annular disc portions 42C and 42D of the stopper piston 42 is provided with four longitudinal grooves 62. The longitudinal grooves 62 are equally spaced about the axis 12, extend along the axis 12 and have a rectangular or radially outwardly open U-shaped cross-sectional shape. The lower surface of the upper annular disc portion 42C is provided with four radial grooves 64 in alignment with the longitudinal grooves 62. An annular groove 66 is provided at the lower end of the cylindrical portion 42E. Further, on the lower surface of the O-ring seal 50 facing the upper surface of the lower annular disc portion 42D, four radial grooves 68 having an arc-shaped cross-sectional shape are provided substantially in alignment with the longitudinal grooves 62. Notably, the number of the longitudinal grooves 62 and the radial grooves 64 and 68 may be other than four. When a combination of a key and a key groove prevents the O-ring seal 50 from rotating about the axis 12 with respect to the stopper piston 42, the annular groove 66 may be omitted.

Unlike the longitudinal grooves 56 in the first embodiment, a cross-sectional area of the longitudinal grooves 62 is set to a size that exhibits throttling effect. Accordingly, the longitudinal grooves 62 function as orifices in a situation where the stopper piston 42 is moved upward by the stopper disk 44 in the extension stroke of the shock absorber 10. Thus, the longitudinal grooves 62 cooperate with the radial grooves 64 and 68, the annular groove 66, etc. to form an orifice passage that connects the upper stopper chamber 48U and the lower stopper chamber 48L.

As described later, the O-ring seal 50 also functions as an elastically deformable member. Therefore, as shown in FIG. 8, no member corresponding to the elastic disc 52 in the first embodiment is provided. However, a cushioning material may be fixed to the upper surface of the stopper disk 44 so as to prevent the stopper disk from striking the stopper piston 42 in the extension stroke of the shock absorber 10.

It is preferable that the inner diameter of the stopper piston 42 is set to a value such that the stopper piston can be displaced along the axis 12 with respect to the rod portion 30B of the piston 30, but the oil does not substantially flow through between the stopper piston and the rod portion. Further, an O-ring seal may be arranged to seal between the stopper piston and the rod portion, if necessary, such that the oil can be effectively prevented from flowing between the stopper piston and the rod portion. The same applies to the third embodiment described later.

In the second embodiment, in the extension stroke of the shock absorber 10, when a relative displacement in the extension direction of the piston 30 with respect to the cylinder 14 exceeds the reference value, the stopper disc 44 abuts against the stopper piston 42, and the stopper piston is moved upward by the stopper disc. When the stopper piston 42 moves upward, the O-ring seal 50 abuts on the lower annular disc portion 42D and moves upward, so that the longitudinal grooves 62 function as orifices, and the pressure in the upper stopper chamber 48U becomes higher than the pressure in the lower stopper chamber 48L.

As a result, the O-ring seal 50 is pressed against the lower annular disc portion 42D to be compressively deformed by a differential pressure between the pressures in the upper and lower stopper chambers, so that as shown in FIG. 10, the radial grooves 68 deform so as to reduce their depth, and the cross-sectional areas decrease. Thus, the radial grooves 68 cooperate with the lower annular disc portion 42D to function as orifices (a part of the orifice passage). The differential pressure and the reduction amount of the cross-sectional areas of the radial grooves 68 become larger as the upward moving speed of the stopper piston 42 and the O-ring seal 50 increases. Therefore, the higher the moving speed, the higher the damping force generated by the throttling effect given to the oil flowing through the radial grooves 68.

In the second embodiment, the spring force of the compression coil spring 46 does not contribute to the compressive deformation of the O-ring seal 50 which is an elastically deformable member. However, the spring force of the compression coil spring 46 biases the stopper piston 42 downward, so that the piston 30 is biased in the compression direction with respect to the cylinder 14 via the stopper piston and the stopper disk 44. Therefore, as in the first embodiment, the spring force of the compression coil spring 46 contributes to suppressing the relative displacement of the piston 30 in the extension direction.

Thus, although not shown in the figures, a force Fre for suppressing the relative displacement in the extension direction of the piston 30 increases, as does the solid line in FIG. 5, as a relative velocity Vre of the piston 30 increases, and increases as a relative displacement amount Lre of the piston 30 increases. In addition, a rate of increase of the force Fre with the increase of the relative velocity Vre becomes larger as the relative velocity Vre becomes higher. Therefore, according to the second embodiment, as in the first embodiment, the piston 30 can be effectively decelerated and stopped even in a situation where the relative speed Vre is high while reducing the possibility that an occupant or occupants feels a shock at the start of the generation of the damping force in the hydrostopper 40. Accordingly, it is possible to reduce the possibility that the rebound stopper hit and a shock and a sound due to the hit are generated.

In particular, according to the second embodiment, the O-ring seal 50 not only functions as a seal member that divides the upper cylinder chamber 22U into the upper stopper chamber 48U and the lower stopper chambers 48L, but also functions as an elastically deformable member that changes the effective passage cross-sectional area of the orifice passage. Therefore, for example, the number of parts can be reduced and the structure of the hydrostopper 40 can be simplified as compared to where an elastically deformable member (the elastic disc 52) other than the O-ring seal 50 is provided as in the first embodiment.

Further, according to the second embodiment, the stopper piston 42 is provided with the annular groove 66 which serves as a part of the orifice passage. Even if the O-ring seal 50 rotates about the axis 12 with respect to the stopper piston 42 and the radial grooves 68 does not align with the longitudinal grooves 62, the annular groove always communicates with the radial grooves, so that it is maintained in communication with the longitudinal grooves. Therefore, the orifice passage can ensure that the upper stopper chamber and the lower stopper chamber are always connected to each other without requiring a configuration for preventing the O-ring seal 50 from rotating about the axis 12 with respect to the stopper piston 42, such as a combination of a key and a key groove.

Third Embodiment

Figure 11:
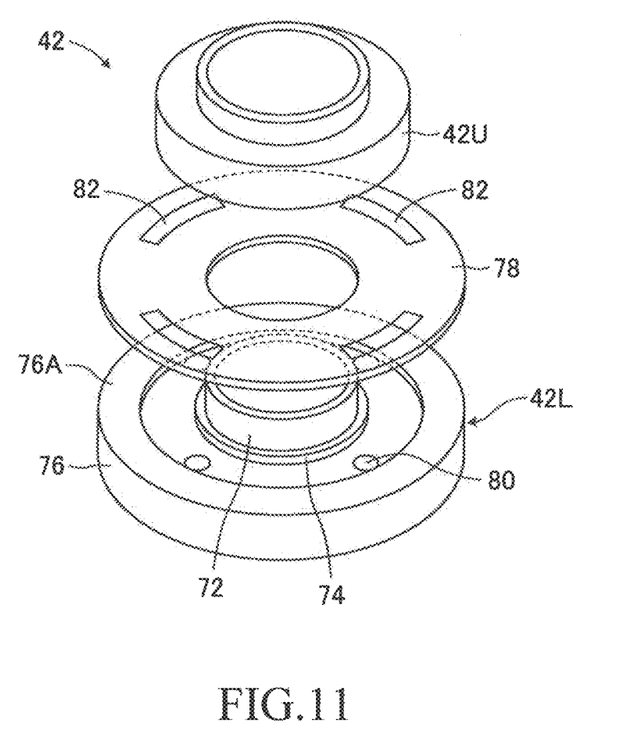
FIG. 11 is an exploded perspective view showing a stopper piston of a hydrostopper in the third embodiment of the shock absorber according to the present disclosure.

FIG. 11 is an exploded perspective view showing the stopper piston of the hydrostopper in the third embodiment of the shock absorber according to the present disclosure.

Figure 12:
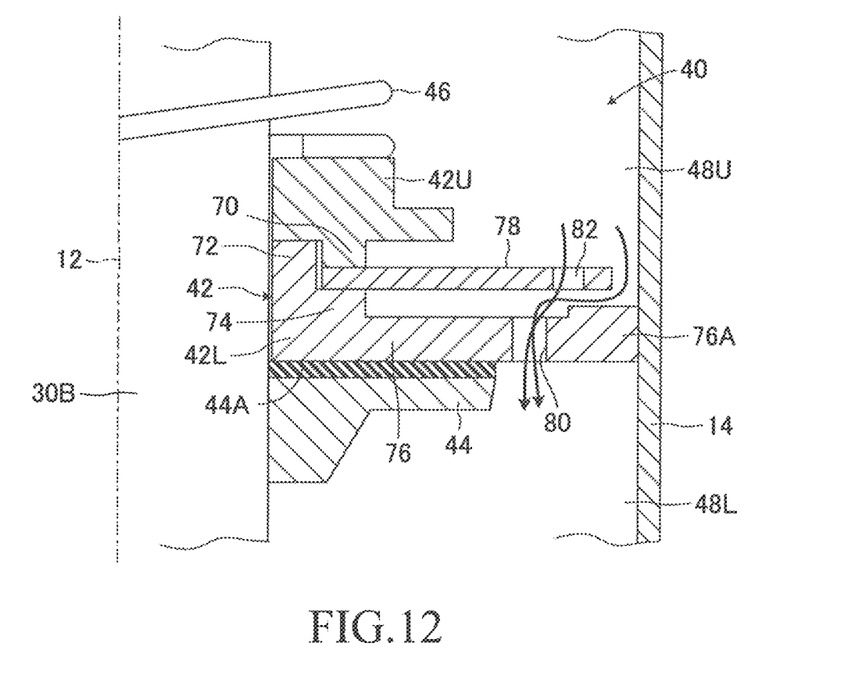
FIG. 12 is an enlarged partial sectional view showing a main part of the hydrostopper in the third embodiment for a situation where a relative velocity Vre of a piston is low.
Figure 13:
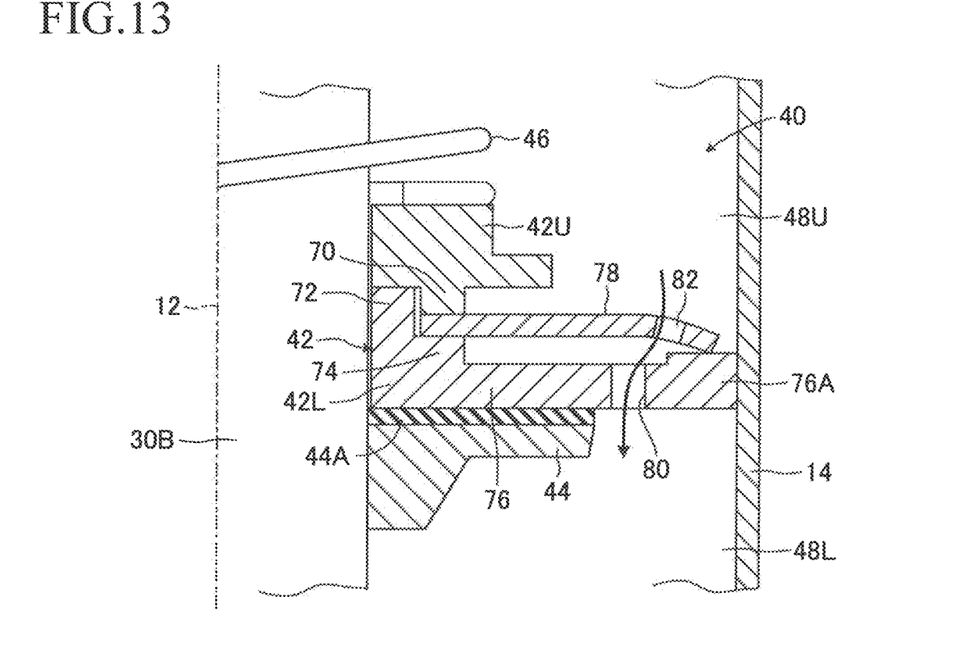
FIG. 13 is an enlarged partial sectional view showing the main part of the hydrostopper according to the third embodiment for a situation where the relative velocity Vre of the piston is medium.
Figure 14:
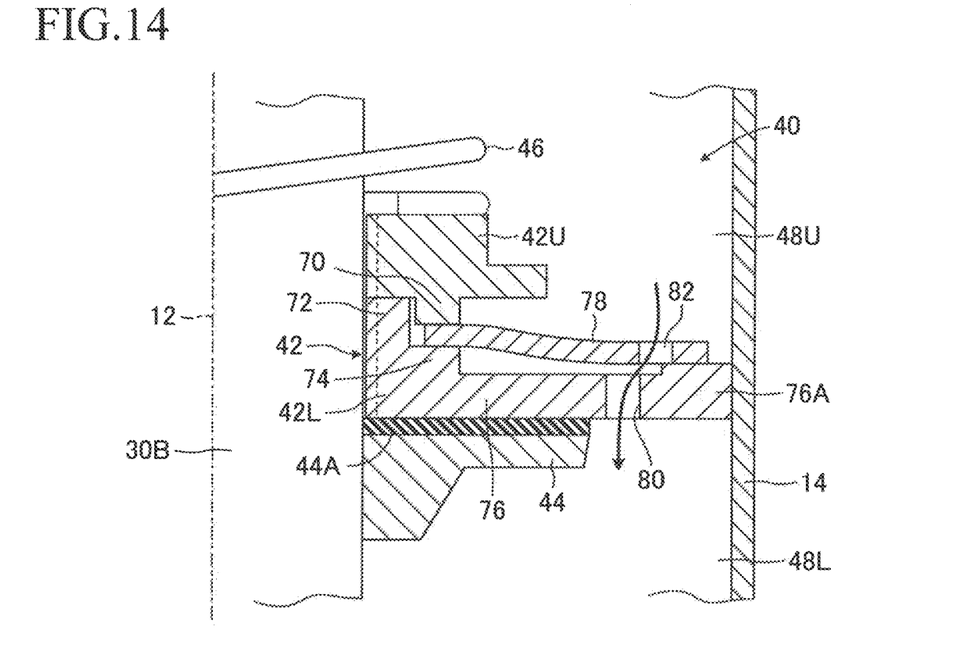
FIG. 14 is an enlarged partial sectional view showing the main part of the hydrostopper in the third embodiment for a situation where a relative velocity Vre of the piston is high.

In the third embodiment, the stopper piston 42 is composed of an upper piston member 42U and a lower piston member 42L. The upper piston member 42U and the lower piston member 42L may also be formed of metal or resin. As shown in FIGS. 12 to 14, the upper piston member 42U has a cylindrical convex portion 70 projecting downward in the figures along the axis 12 at a position spaced radially outward from the cylindrical inner peripheral surface. The lower piston member 42L has a small diameter portion 72 and a large diameter portion 74 extending along the axis 12, and a disk portion 76 extending perpendicularly to the axis 12, and the disk portion 76 has a rim portion 76A whose thickness is larger than that of other portions. Although not shown in FIGS. 11 to 14, an O-ring seal for sealing between the cylinder 14 and the stopper piston 42 may be disposed on the outer peripheral portion of the rim portion 76A.

The upper piston member 42U and the lower piston member 42L are integrated by press-fitting the convex portion 70 and the small diameter portion 72 with each other. An annular plate-like reed valve 78 functioning as an elastically deformable member is held between the convex portion 70 and the large diameter portion 74 at the inner peripheral portion, and thus held in a state of being vertically separated from the upper piston member 42U and the lower piston member 42L. The reed valve 78 is formed of an elastic material such as metal or resin so as to be elastically bent as shown in FIGS. 13 and 14.

In FIGS. 12 to 14, a rubber cushion member 44A is fixed to the upper surface of the stopper disk 44, and the cushion member 44A is illustrated in a state of being in contact with the lower surface of the lower piston member 42L. However, as in the first and second embodiments, when the relative displacement in the extension direction of the piston 30 with respect to the cylinder 14 is less than the reference value, the stopper disc 44 and the cushion member 44A are separated downward from the lower piston member 42L.

The disc portion 76 is provided with four through holes 80 extending along the axis 12 close to the rim portion 76A, and the through holes 80 are equally spaced around the axis 12. The reed valve 78 is provided with four communicating holes 82 extending in an arc shape in the circumferential direction around the axis 12 at circumferential positions aligned with the through holes 80. Thus, as shown in FIGS. 12 to 14, the through holes 80, the communication holes 82 and the space between the outer peripheral portion of the reed valve 78 and the rim portion 76A form an orifice passage connecting the upper stopper chamber 48U and the lower stopper chamber 48L. Notably, the number of the through holes 80 and the communication holes 82 may be other than four.

In the third embodiment, the stopper piston 42 is moved upward by the stopper disk 44 when the amount of relative displacement of the piston 30 in the direction of extension with respect to the cylinder 14 exceeds the reference value in the extension stroke of the shock absorber 10. When the stopper piston 42 moves upward, a volume of the upper stopper chamber 48U decreases and a volume of the lower stopper chamber 48L increases. As a result, the pressure in the upper stopper chamber 48U becomes higher than the pressure in the lower stopper chamber 48L, so that, as shown by flow lines in FIG. 12, the oil 26 in the upper stopper chamber 48U flows through the orifice passage to the lower stopper chamber 48L.

When a relative velocity Vre of the piston 30 is low, the differential pressure between the pressures in the upper stopper chamber 48U and the lower stopper chamber 48L is small because the throttling effect exerted by the orifice passage is low. As a result, as shown in FIG. 12, an amount of bending deformation of the reed valve 78 due to the differential pressure is very small. Therefore, a decrease in the effective passage cross-sectional area of the orifice passage is also very small, and a damping force generated by the throttling effect of the orifice passage is also very small.

When the relative velocity Vre of the piston 30 is medium, a differential pressure between the pressures in the upper stopper chamber 48U and the lower stopper chamber 48L increases, and as shown in FIG. 13, the reed valve 78 is bent, and the cross-sectional area of the space between the outer peripheral edge of the reed valve 78 and the rim portion 76A (a part of the orifice passage) is reduced. When the differential pressure further increases, the outer peripheral edge of the reed valve abuts on the rim portion 76A. Thus, the rim portion 76A functions as a valve seat, and the oil 26 cannot flow through the space between the outer peripheral portion of the reed valve 78 and the rim portion 76A. Therefore, the through holes 80 function as orifices (a part of the orifice passage), the reduction amount of the effective passage cross-sectional area of the orifice passage increases, and the damping force generated by the throttling effect of the orifice passage also increases.

Further, when the relative velocity Vre of the piston 30 is high, a differential pressure between the pressures in the upper stopper chamber 48U and the lower stopper chamber 48L further increases, and as shown in FIG. 14, the differential pressure causes the reed valve 78 to be largely bent, and the range of the outer peripheral portion of the reed valve that contacts the rim portion 76A is increased. As a result, the oil 26 cannot flow through the space between the outer peripheral portion of the reed valve 78 and the rim portion 76A, but can pass only through portions of the communication holes 82 not blocked by the rim portion 76A. Therefore, an amount of decrease in the effective passage cross-sectional area of a part of the orifice passage becomes very large, and the throttling effect of the orifice passage becomes higher, so that the generated damping force is further increased.

The damping force increases as the relative speed Vre of the piston 30 increases, regardless of whether the relative speed of the piston 30 is any one of the above three. The spring force of the compression coil spring 46 increases as the relative displacement amount Lre of the piston 30 increases. Therefore, although not shown in the figures, similar to the solid lines in FIG. 5, the force Fre for suppressing the relative displacement in the extension direction of the piston 30 increases as the relative velocity Vre of the piston 30 increases and increases as the relative displacement amount Lre of the piston 30 increases. In addition, a rate of increase of the force Fre with the increase of the relative velocity Vre becomes larger as the relative velocity Vre becomes higher. Therefore, according to the third embodiment, as in the first and second embodiments, the piston 30 can be effectively decelerated and stopped even in a situation where the relative speed Vre is high, while reducing the possibility that an occupant or occupants may feel a shock at the start of the generation of the damping force in the hydrostopper 40.

In particular, according to the third embodiment, since the reed valve 78 functioning as an elastically deformable member may be an annular plate member, compared to the first and second embodiments in which the elastically deformable member is an elastic disk member, the dimension of the parts such as the stopper piston 42 in the direction along the axis 12 can be reduced.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the cross-sectional shape of the radial grooves 58 and 64 forming parts of the orifice passage is arc-shaped, but may be triangular, polygonal such as quadrangular, partial oval, or U-shaped.

In the above-described second embodiment, the O-ring seal 50 is vertically spaced from the upper annular disc portion 42C and the lower annular disc portion 42D of the stopper piston 42 in the standard state. However, the O-ring seal 50 may be in contact with the upper surface of the lower annular disc portion 42D in the standard state.

In the above-described second embodiment, the O-ring seal 50 is pressed against the lower annular disc portion 42D by a differential pressure between the pressures in the upper stopper chamber 48U and the lower stopper chamber 48L to be compressively deformed, and the radial grooves 68 deform to reduce the depth and reduce the cross-sectional area. Thus, the lower portion of the O-ring seal 50 may be formed of a material that is more easily elastically deformed than other portions.

Further, in the above-described second embodiment, at least a portion of the radial grooves 68 may be internal passages extending within the O-ring seal 50, and their cross-sectional shapes may be deformed by compression of the O-ring seal such that the effective passage cross-sectional areas are reduced.

Further, in the above-described first to third embodiments, although the shock absorber 10 is configured as a twin-tube type shock absorber, the shock absorber of the present disclosure may be configured as a mono-tube type shock absorber.

What is claimed is:

1. A shock absorber with a hydrostopper comprising: a cylinder, a piston fitted to the cylinder and cooperating with the cylinder to form first and second cylinder chambers of variable volume, the first cylinder chamber receiving a rod portion of the piston, and a hydrostopper that is configured to limit relative displacement of the piston in an extension direction relative to the cylinder; the hydrostopper comprising a stopper piston that is fitted to the rod portion so as to be relatively displaceable along the rod portion and divides the first cylinder chamber into first and second stopper chambers, an engagement member fixed to the rod portion in the second stopper chamber located on the side of the second cylinder chamber relative to the stopper piston, an elastically deformable member fixed to the engagement member on a side of the stopper piston, and a biasing member for biasing the stopper piston against the engagement member, and the stopper piston having an orifice passage connecting the first and second stopper chambers, wherein the elastically deformable member is configured to form an orifice in a part of the orifice passage when the elastically deformable member is compressed against the stopper piston by the engagement member when the piston displaces in an extension direction relative to the cylinder, reduce an effective passage cross-sectional area of the orifice passage by elastic deformation, and increase a reduction amount of the effective passage cross-sectional area as a differential pressure between pressures in the first and second stopper chambers is larger when the pressure in the first stopper chamber is higher than the pressure in the second stopper chamber, and wherein the orifice passage includes radial grooves formed in a surface of the stopper piston opposing the elastically deformable member, and the elastically deformable member is configured to cooperate with the radial grooves to form orifices, and reduce a cross-sectional area of each orifice by elastic deformation, thereby reducing the effective passage cross-sectional area of the orifice passage.

2. The shock absorber with a hydrostopper according to claim 1, wherein the elastically deformable member is formed of a rubber-like elastic material, and is configured to be compressively deformed by being compressed between the stopper piston and the engagement member and enter the radial grooves, thereby reducing the effective passage cross-sectional area of each orifice.

* * * * *